(12) United States Patent
Chang

(10) Patent No.: US 7,854,301 B2
(45) Date of Patent: Dec. 21, 2010

(54) FIXING AND COMBINING DEVICE FOR THE BRAKE DISC OF A REMOTE-CONTROLLED MODEL CAR

(75) Inventor: Lien Sheng Chang, Taichung Shien (TW)

(73) Assignee: Golden Lion Enterprise Co., Ltd., Taichung Shien (TW)

( * ) Notice: Subject to any disclaimer, the term of this patent is extended or adjusted under 35 U.S.C. 154(b) by 605 days.

(21) Appl. No.: 11/812,982

(22) Filed: Jun. 22, 2007

(65) Prior Publication Data

US 2008/0314698 A1   Dec. 25, 2008

(51) Int. Cl.
*B60T 1/06* (2006.01)
(52) U.S. Cl. .................. 188/18 A; 188/71.1; 301/6.8
(58) Field of Classification Search ................ 188/71.1, 188/71.5, 81 A, 218 XL, 73.1, 26; 301/6.1, 301/6.5, 6.8
See application file for complete search history.

(56) References Cited

U.S. PATENT DOCUMENTS

| | | | | |
|---|---|---|---|---|
| 2,964,137 A | * | 12/1960 | Luedtke et al. ............. | 188/71.5 |
| 3,465,860 A | * | 9/1969 | Gingery .................... | 192/70.16 |
| 3,955,650 A | * | 5/1976 | Ellis ......................... | 188/18 A |
| 5,437,351 A | * | 8/1995 | Lindner .................... | 188/18 A |
| 7,188,711 B2 | * | 3/2007 | Gripemark et al. ........ | 188/18 A |
| 2007/0012527 A1 | * | 1/2007 | Wu ............................ | 188/71.5 |

* cited by examiner

*Primary Examiner*—Thomas J Williams
(74) *Attorney, Agent, or Firm*—Ming Chow; Sinorica, LLC

(57) ABSTRACT

A fixing and combining device for the brake disc of a remote-controlled model car includes a connecting cup and a brake disc. The connecting cup has one side provided with a cup-shaped transmission member having two opposite sides of its circumferential wall respectively cut with an engage notch for receiving transmission rod therein. The brake disc is bored with a center hole matching with the transmission member and having the opposite sides of its inner annular edge formed with at least two combining projections to be respectively combined with the inner sides of the two engage notches of the connecting cup after the transmission member is inserted through the center hole of the brake disc. Thus, the brake disc can be tightly fixed between the engage notches of the connecting cup and the transmission rod by the combining projections.

4 Claims, 7 Drawing Sheets

FIXING AND COMBINING DEVICE FOR THE BRAKE DISC OF A REMOTE-CONTROLLED MODEL CAR

BACKGROUND OF THE INVENTION

1. Field of the Invention

This invention relates to a fixing and combining device for the brake disc of a remote-controlled model car, particularly to one having the brake disc formed integral with plural combining projections at the annular edge of its center hole to be tightly fixed between the engage notches of a combining cup and a transmission rod, able to enhance the strength of the brake disc combined.

2. Description of the Prior Art

Referring to FIGS. 1 and 2, the brake device of a conventional remote-controlled model car 10 is composed of a combining cup 11, a movable brake plate 12, a brake disc 13 and a fixed brake plate 14. The combining cup 11 has its front side provided with a transmission shaft 111, and the brake disc 13 is bored with a center hole 131 having the same shape as that of the outer periphery of the combining cup 11 for the combining cup 11 to be inserted therethrough so as to combine the brake disc 13 together with the combining cup 11 in a tight way. In addition, the brake disc 13 is clamped between the movable brake plate 12 and the fixed brake plate 14. Thus, when the movable brake plate 12 and the fixed brake plate 14 mutually carry out clamping motion, a friction resistance will be produced to let the brake disc 13 and the transmission shaft 111 stop rotating and brake the remote-controlled model car.

However, referring to FIG. 3, the combining cup 11 of the conventional remote-controlled model car 10 is tightly engaged with the inner edge of the center hole 131 of the brake disc 13 and actuated by the brake disc 13 to stop rotating, and both the combining cup 11 and the brake disc 13 are made of metal. Therefore, due to being tightly engaged with the combining cup 11, the combining portion 132 of the inner edge of the center hole 131 of the brake disc 13 is likely to be easily worn off and produce a gap. As a result, the combining cup 11 and the brake disc 13 are unable to be kept tightly fitted together, rendering the brake disc 13 liable to fall off. Under the circumstances, when the remote-controlled model car is running, the brake disc 13 is easy to vibrate to make noises, and when the running remote-controlled model car is to be braked, it may result in virtual work owing to the gap between the brake disc 13 and the combining cup 11, thus impossible to quickly brake the remote-controlled model car and likely to lower braking efficacy.

SUMMARY OF THE INVENTION

The objective of this invention is to offer a fixing and combining device for the brake disc of a remote-controlled model car, which is composed of a connecting cup and a brake disc. The connecting cup has one side formed with a cup-shaped transmission member having the opposite sides of its circumferential wall respectively cut with an engage notch for a transmission rod to be fitted therein. The brake disc is bored with a center hole matching with the transmission member of the connecting cup, and the center hole has at least two opposite sides of its annular inner edge respectively formed integral with a combining projection. Thus, when the transmission member of the connecting cup is inserted through the center hole of the brake disc, the combining projections at the inner annular edge of the center hole can be respectively combined with the inner sides of the engage notches of the connecting cup, letting the brake disc tightly positioned between the engage notches of the connecting cup and the transmission rod by means of the combining projections. The combining projections of the brake disc are able to enhance the strength of the brake disc combined and disperse applied force of braking, thus preventing the brake disc from being worn off easily, avoiding producing a gap between the brake disc and the connecting cup and enabling the brake disc to be tightly fixed between the engage notches of the combining cup and the transmission rod to never fall off.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
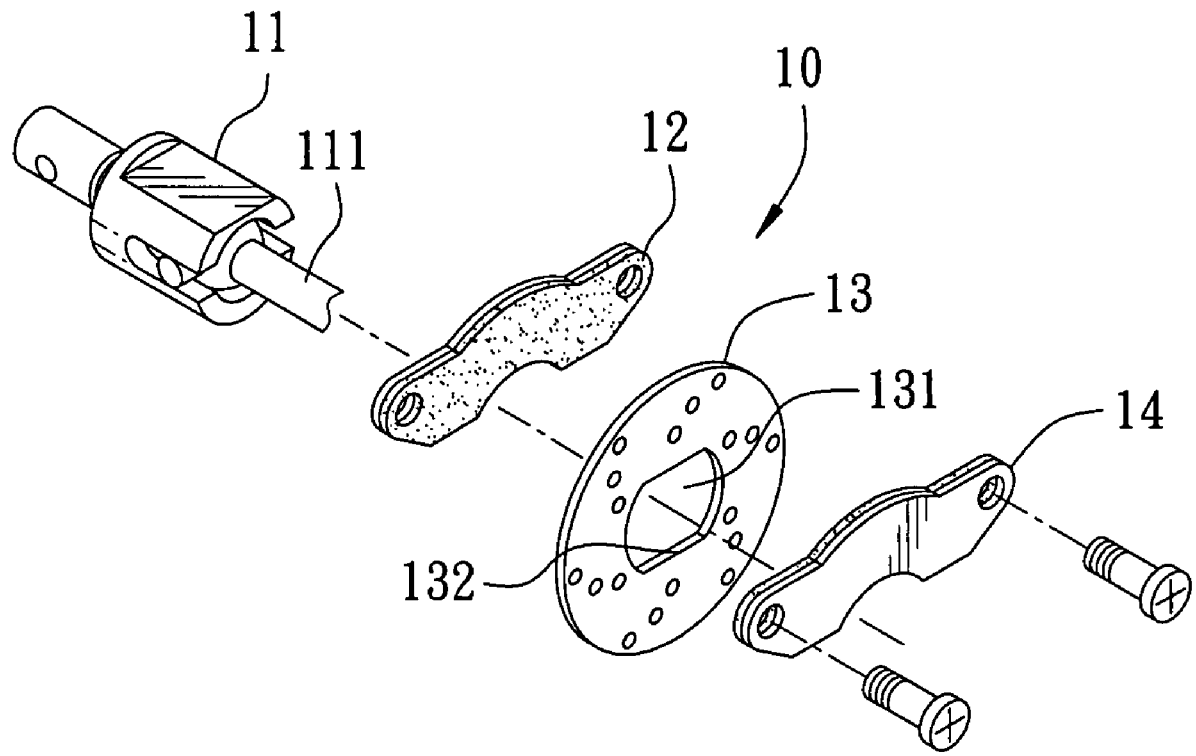
FIG. 1 is an exploded perspective view of the brake disc of a conventional remote-controlled model car.
Figure 2:
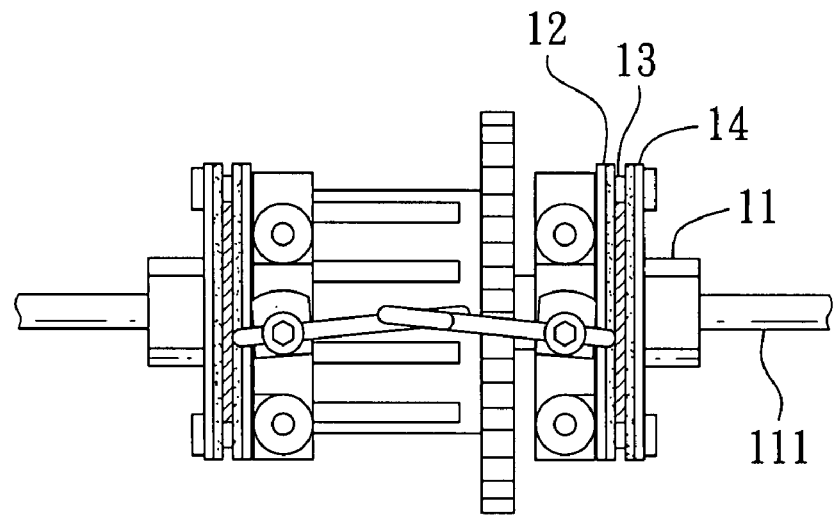
FIG. 2 is an upper view of the brake disc of the conventional remote-controlled model car.
Figure 3:
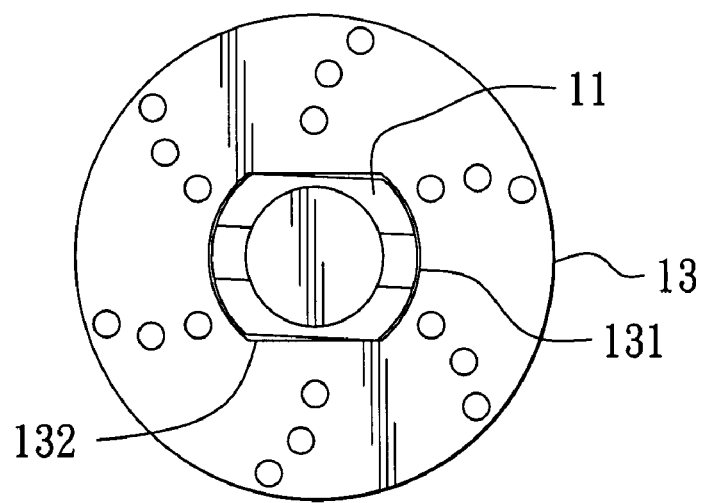
FIG. 3 is a front view of the brake device of the conventional remote-controlled model car in an operating condition.
Figure 4:
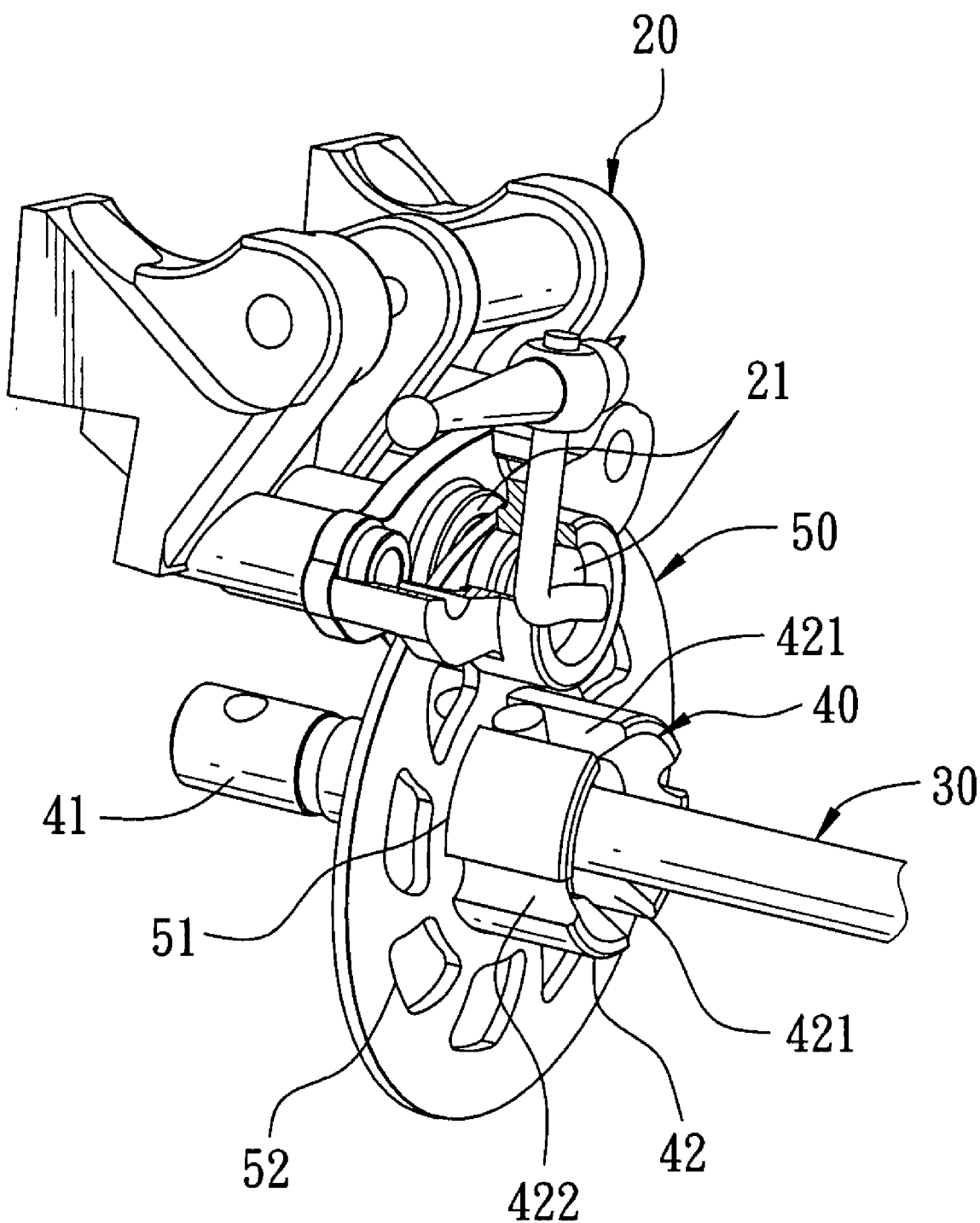
FIG. 4 is a perspective view of a first preferred embodiment of a fixing and combining device for the brake disc of a remote-controlled model car in the present invention.
Figure 5:
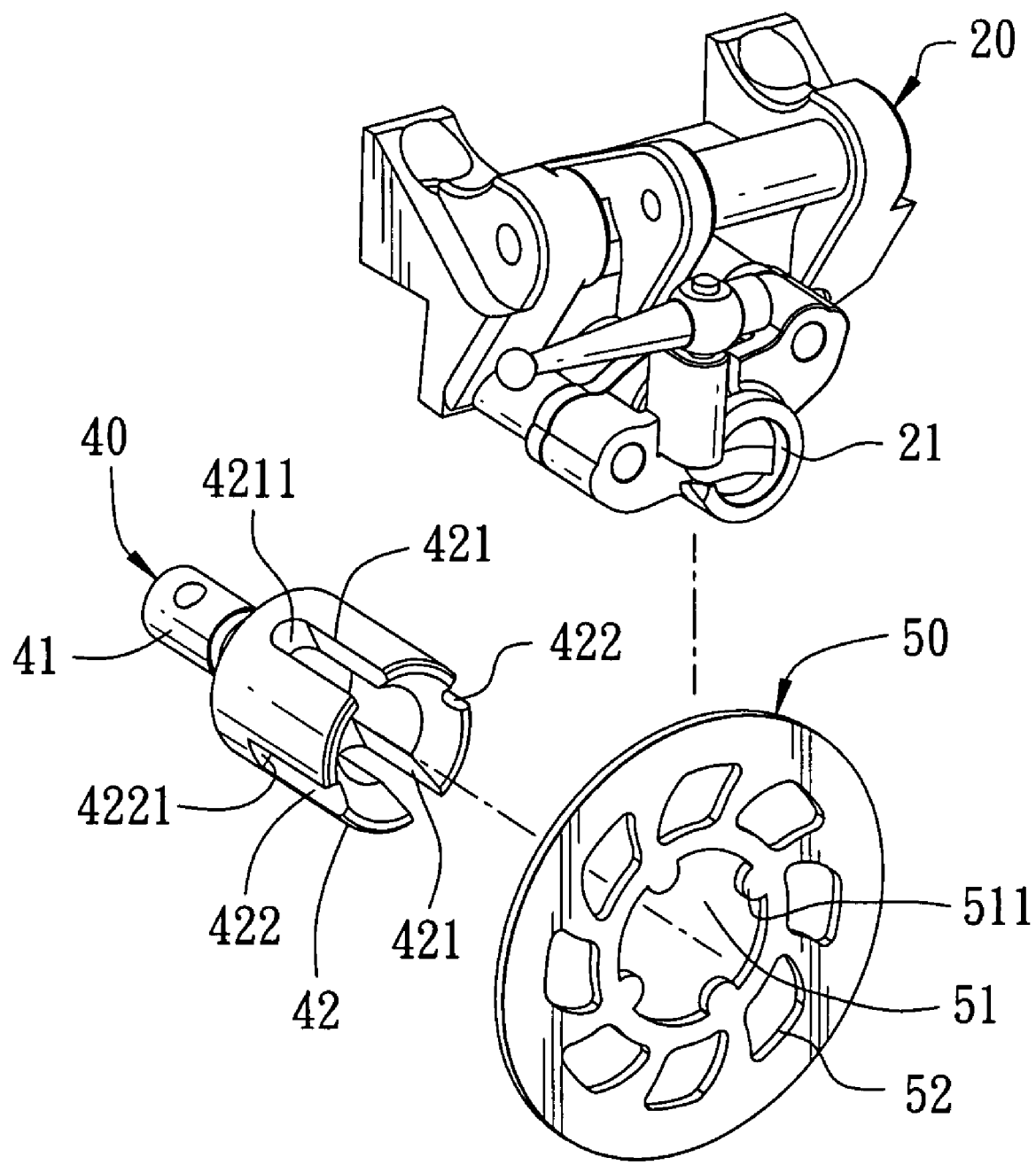
FIG. 5 is an exploded perspective view of the first preferred embodiment of the fixing and combining device for the brake disc of a remote-controlled model car in the present invention.

A first preferred embodiment of a fixing and combining device for the brake disc of a remote-controlled model car in the present invention, as shown in FIGS. 4 and 5, includes a brake device 20, a transmission rod 30, a connecting cup 40 and a brake disc 50 combined together.

The brake device 20 is provided with a set of brake plates 21 for clamping the brake disc 50.

The connecting cup 40 has its rear side axially fixed with a main shaft 41 to be positioned beneath the brake device 20 and its front side axially disposed with a cup-shaped transmission member 42. The transmission member 42 has the upper and the lower opposite sides of its circumferential wall respectively cut with an axial engage notch 421 for the transmission rod 30 to be fitted therein, and the left and the right opposite sides of its circumferential edge respectively disposed with a semi-circular combining recess 422, letting the engage notches 421 and the combining recesses 422 separated from one another equidistantly in the circumferential wall of the transmission member 42.

The brake disk 50 is bored with a center hole 51 matching with the transmission member 42 of the connecting cup 40. The center hole 51 has its inner circumferential edge disposed with four semi-circular combining projections 511 spaced apart equidistantly to be respectively fitted in the engage notches 421 and the combining recesses 422 in the circumferential wall of the transmission member 42. Further, the brake disc 50 has its outer annular portion bored with eight through holes 52 spaced apart equidistantly and arranged orderly.

Figure 6:
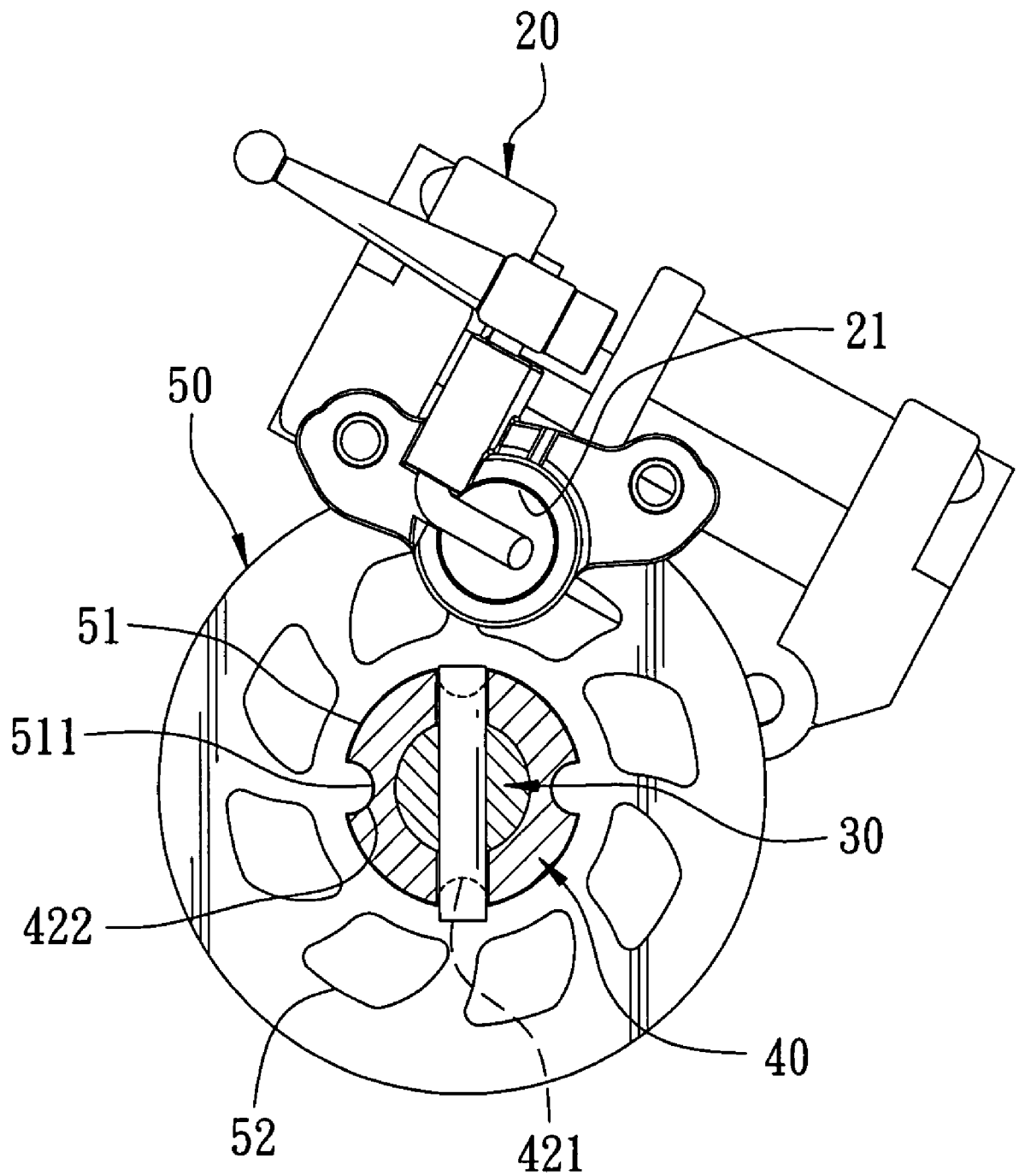
FIG. 6 is a cross-sectional view of the first preferred embodiment of the fixing and combining device for the brake disc of a remote-controlled model car in the present invention.

In assembling, as shown in FIGS. 5 and 6, firstly, the transmission member 42 of the connecting cup 40 is inserted through the center hole 51 of the brake disc 50, letting the upper and the lower combining projection 511 respectively combined with the inner sides 4211 of the two engage notches 421, and the left and the right combining projection 511 respectively combined with the inner sides 4221 of the two combining recesses 422. Next, the transmission rod 30 has the opposite projections at one end respectively fitted in the two engage notches 421 of the connecting cup 40, letting the combining projections 511 of the brake disc 50 clamped between the transmission rod 30 and the inner sides 4211 and 4221 of the engage notches 421 and the combining recesses 422. By so designing, when the running remote-controlled model has the brake disc 50 stopped rotating for carrying out braking, the transmission rod 30 will synchronously be stopped rotating and the remote-controlled model car will be braked.

The combining projections 511 formed at the inner annular edge of the center hole 51 of the brake disc 50 are able to enhance the strength of the brake disc 50 combined and disperse applied force of braking, thus preventing the brake disc 50 from being worn off easily, avoiding producing a gap between the brake disc 50 and the connecting cup 40 and enabling the brake disc 50 to be tightly fixed between the engage notches 421 and the transmission rod 30 to never fall off. In addition, the brake disc 50 is bored with eight through holes 52 for lowering cost in material and lightening the device as well as for dissipating hot air produced during braking.

Figure 7:
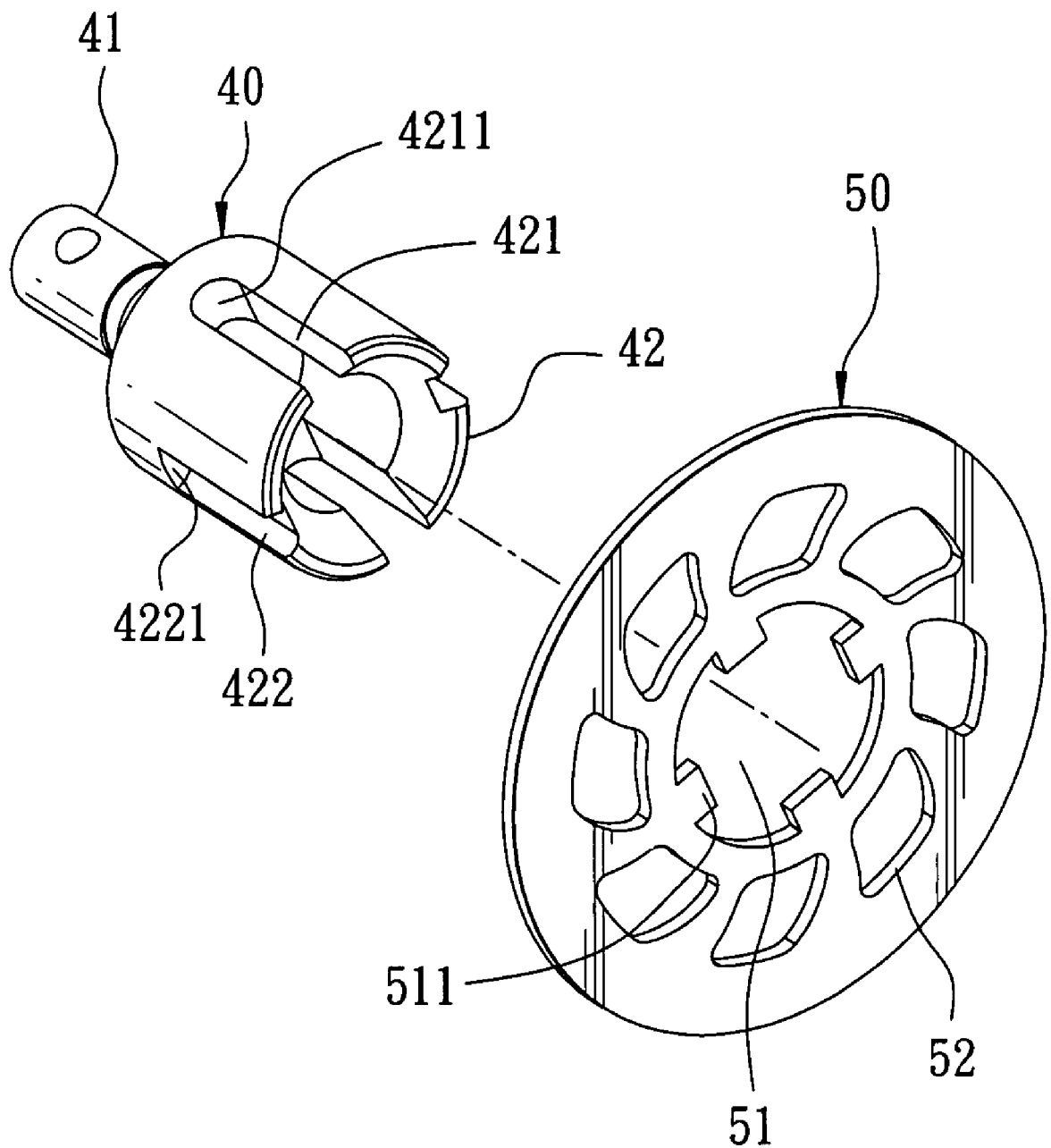
FIG. 7 is a partial exploded perspective view of a second preferred embodiment of a fixing and combining device for the brake disc of a remote-controlled model car in the present invention.

A second preferred embodiment of a fixing and combining device for the brake disc of a remote-controlled model car in the prevent invention, as shown in FIG. 7, has almost the same structure as that described in the first preferred embodiment, except that the four combining projections 511 of the brake disc 50 are rectangle-shaped instead of the semi-circular shaped ones, and the left and the right combining recesses 422 of the connecting cup 40 are rectangular recesses, and the axial inner sides 4221 of the two combining recesses 422 are also rectangle-shaped for matching with the rectangular combining projections 511. Thus, the upper and the lower combining projections 511 of the brake disc 50 can be respectively combined with the inner sides 4211 of the two engage notches 421, and the left and the right combining projections 511 can be respectively combined with the inner sides 4221 of the two combining recesses 422 of the connecting cup 40.

Figure 8:
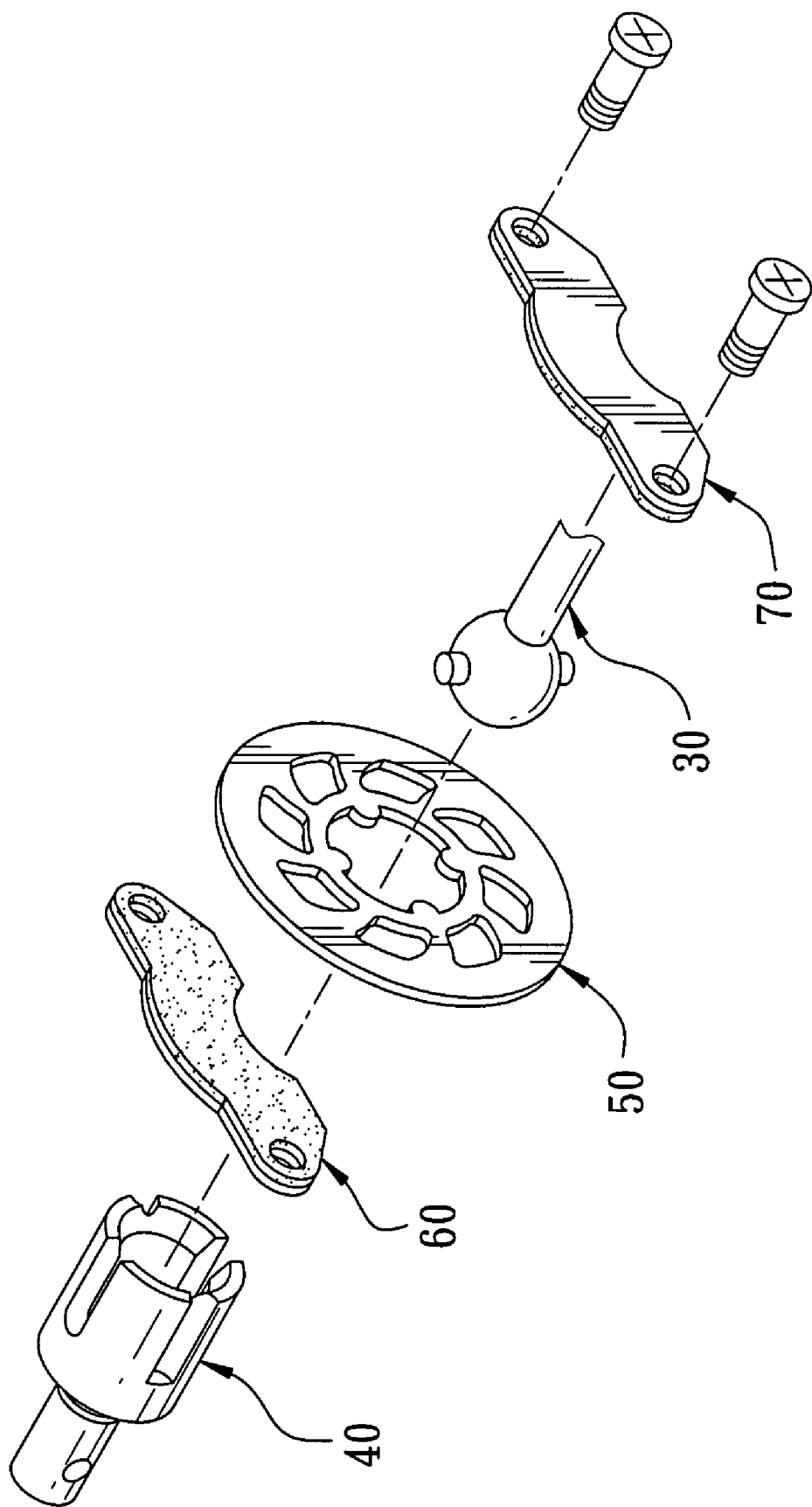
FIG. 8 is an exploded perspective view of a third preferred embodiment of a fixing and combining device for the brake disc of a remote-control led model car in the present invention.

A third preferred embodiment of a fixing and combining device for the brake disc of a remote-controlled model car in the present invention, as shown in FIG. 8, has almost the same structure as that described in the first preferred embodiment, except that a movable brake plate 60 and a fixed brake plate 70 are respectively fixed at the opposite sides of the brake disc 50, letting the brake disc 50 clamped between the movable brake plate 60 and the fixed brake plate 70 and combined together. Thus, when the movable brake plate 60 and the fixed brake plate 70 mutually carry out clamping motion, a friction resistance will be produced to let the brake disc 50 and the connecting cup 40 stop rotating for braking the remote-controlled model car.

To sum up, the fixing and combining device for the brake disc of a remote-controlled model car in the present invention can tightly fixing the brake disc between the engage notches of the combining cup and the transmission rod by means of the combining projections formed integral at the inner annular edge of the center hole of the brake disc. The combining projections are able to heighten the strength of the brake disc combined and disperse applied force of braking, thus preventing the brake disc from being worn off easily, avoiding producing a gap between the brake disc and the combining cup and enabling the brake disc to be tightly fixed in position.

While the preferred embodiments of the invention have been described above, it will be recognized and understood that various modifications may be made therein and the appended claims are intended to cover all such modifications that may fall within the spirit and scope of the invention.

I claim:

1. A fixing and combining device for a brake disc of a remote-controlled model car comprising:

a connecting cup having one side fixed with a main shaft, said main shaft positioned beneath a brake device of a remote-controlled model car, said connecting cup having another side provided with a cup-shaped transmission member, said transmission member having the opposite sides of its circumferential wall respectively cut with an engage notch, said remote-controlled model car provided with a transmission rod to be fitted in said two engage notches of said transmission member;

a brake disc bored with a center hole matching with said transmission member of said connecting cup, said center hole of said brake disc having its inner annular edge formed integral with at least two combining projections, said two combining projections respectively positioned at opposite sides of said inner annular edge of said center hole, said transmission member of said connecting cup inserted through said center hole of said brake disc, said combining projections of said brake disc respectively combined with the axial inner sides of said two engage notches of said connecting cup; and said brake disc is clamped between said transmission rod and said inner sides of said engage notches of said connecting cup.

2. The fixing and combining device for the brake disc of a remote-controlled model car as claimed in claim 1, wherein said connecting cup has a left and a right side of its circumferential wall respectively cut with a combining recess, and said center hole of said brake disc has a left and a right side of its inner annular edge respectively formed with a combining projection to be combined with an inner side of said combining recess of said connecting cup.

3. The fixing and combining device for the brake disc of a remote-controlled model car as claimed in claim 2, wherein said combining projections of said center hole of said brake disc are respectively shaped semi-circular, and said two combining recesses are also semi-circular.

4. The fixing and combining device for the brake disc of a remote-controlled model car as claimed in claim 2, wherein said combining projections of said center hole of said brake disc are shaped rectangular, and said two combining recesses of said connecting cup are also rectangular.

* * * * *